(12) United States Patent
Lyrstrand

(10) Patent No.: US 7,229,058 B2
(45) Date of Patent: Jun. 12, 2007

(54) CARGO SUPPORT DEVICE

(75) Inventor: Michel Lyrstrand, Mölndal (SE)

(73) Assignee: TTS Ships Equipment AB, Gothenburg (SE)

( * ) Notice: Subject to any disclaimer, the term of this patent is extended or adjusted under 35 U.S.C. 154(b) by 148 days.

(21) Appl. No.: 10/497,115

(22) PCT Filed: Nov. 15, 2002

(86) PCT No.: PCT/SE02/02077

§ 371 (c)(1),
(2), (4) Date: May 27, 2004

(87) PCT Pub. No.: WO03/057555

PCT Pub. Date: Jul. 17, 2003

(65) Prior Publication Data

US 2005/0012315 A1    Jan. 20, 2005

(30) Foreign Application Priority Data

Nov. 28, 2001  (SE)  .................................... 0103992

(51) Int. Cl.
*A47B 97/00*   (2006.01)
(52) U.S. Cl. .................... 248/503; 248/680; 280/763.1
(58) Field of Classification Search ............... 248/503,
248/505, 506, 680, 163.1, 432, 165, 440.1,
248/188, 188.9; 280/762, 763.1; 182/178.1,
182/181.1, 153, 149; 410/100, 103
See application file for complete search history.

(56) References Cited

U.S. PATENT DOCUMENTS

| | | | | |
|---|---|---|---|---|
| 2,449,600 A | * | 9/1948 | Geiger | ....................... 410/100 |
| 2,888,178 A | * | 5/1959 | Olson | ......................... 224/329 |
| 3,073,467 A | * | 1/1963 | Parks | ........................... 254/45 |
| 3,350,116 A | * | 10/1967 | Skirvin et al. | .............. 280/404 |
| 3,545,635 A | * | 12/1970 | Montan | ................... 280/763.1 |
| 3,726,543 A | | 4/1973 | Dalton | |
| 4,294,388 A | * | 10/1981 | Wunstel | ..................... 224/315 |
| 4,757,929 A | * | 7/1988 | Nelson | ....................... 224/329 |
| 4,858,800 A | * | 8/1989 | Holtzclaw et al. | .......... 224/243 |

(Continued)

FOREIGN PATENT DOCUMENTS

JP         7179193         7/1995

(Continued)

*Primary Examiner*—Korie Chan
(74) *Attorney, Agent, or Firm*—Orum & Roth LLC

(57) ABSTRACT

The present invention relates to an arrangement (1) to support the front end (2A) of a trailer (2) when the aforementioned trailer is parked on board vessels (3) and other vehicles, comprising connecting means (4, 5) for the detachable attachment of the support (1) respectively to a 10 trailer of the kind in question and to a mobile loading vehicle (6). The support in this case is in the form of a stand (1) with support legs (7, 8) situated at a mutual distance (A) from one another and with a crossbar (9) extending between them. Tensioning devices (12, 13), such as straps, lines, ropes or chains, are capable of being accumulated internally inside the support stand (1). These are so arranged as to be capable of detachable attachment to the deck (10) of the vessel and of being tensioned. The legs (7, 8) of the support stand exhibit friction-increasing means (51) to increase the friction with the deck (10) of a vessel.

2 Claims, 9 Drawing Sheets

U.S. PATENT DOCUMENTS

| | | | |
|---|---|---|---|
| 5,730,455 A * | 3/1998 | Varnum et al. | 280/475 |
| 6,298,946 B1 * | 10/2001 | Yemini et al. | 182/153 |
| 6,439,594 B1 | 8/2002 | Johansson | |
| 6,471,246 B1 * | 10/2002 | Lagsdin | 280/763.1 |

FOREIGN PATENT DOCUMENTS

| | | |
|---|---|---|
| SE | 509258 | 8/1997 |
| SE | 516519 | 11/2000 |

* cited by examiner

CARGO SUPPORT DEVICE

Applicant claims priority of Application number PCT/SE02/02077 filed on 15 Nov. 2003 and application number 0103992-4 filed on 28 Nov. 2001 with the Swedish Patent and Trademark Office.

The present invention relates to an arrangement for supporting the front end of a trailer in conjunction with parking the aforementioned trailer on board vessels and other vehicles, comprising connecting means for the detachable attachment of the support to a trailer of the kind in question or to a mobile loading vehicle, and the support is in the form of a stand with supporting legs situated at a mutual distance from one another and with a crossbar extending between them.

In the old, previously disclosed technology for securing cargo in the form of trailers on board vessels, use is made of support stands, known as trailer stands, which are pushed into place manually under the trailer once it has arrived in its intended position on board the vessel. A previously disclosed trailer stand of this kind normally weighs between 100 and 150 kg. The aforementioned trailer stand exhibits a pair of wheels suspended by means of springs at the centre of the centrally located bottom beam of the stand. The wheels retract automatically when the trailer is lowered onto the stand. This operation is time-consuming, dangerous (risk of crushing injury when lowering the trailer), heavy, and wear on the vessel deck is high. When using trailer stands of this type, it is necessary in every case to lash the trailer to the vessel. The aforementioned lashings can be in the form of chain, because chain does not exhibit any significant extension. Here, too, the work is time-consuming, dangerous (risk of crushing injury when reversing trailers into position), heavy, and wear on the vessel deck is high. Other types of cargo handling, such as cassette handling, MAFI roll trailers, loose containers, vans and trucks, are used on many boats. Stands of this kind are not required for these types of cargo handling and are accordingly in the way.

Other previously disclosed cargo supports for trailers are illustrated in, for example, WO 97/30890, which shows a stand with pairs of legs which extend down from a horizontal crossbar. Locking devices for locking the aforementioned cargo support to the deck are situated in this case in the legs of the cargo support and are actuated from a cargo vehicle. This solution is complicated and cost-intensive and calls for considerable accuracy when parking the cargo supports on board so that they are positioned directly in line with accommodating openings in the deck for the locking devices.

The following applies in the case of a trailer that has been locked to the cargo deck only by its front end with the help of locking devices that are situated on cargo supports of the kind in question executed in the form of a stand:

Front End of the Trailer:

The stand, which is locked to both the trailer and the cargo deck, causes the front end of the trailer to absorb all forces, both vertical, fore-and-aft and athwartships.

Rear End of the Trailer:

The athwartships and vertical forces remain when the stand absorbs the fore-and-aft forces. These absorb the friction of the deck until the forces become too great and cause the trailer to rotate about its kingpin, after which the rear part will require to be lashed in order to prevent this.

It is thus the friction between the tyres of the trailer and the deck of the vessel that hold the trailer in place. At the same time, it is necessary to be aware that a vessel is normally always subject to higher athwartships and vertical acceleration than fore-and-aft acceleration. It should thus be possible for a cargo support of the kind in question to be set up with a trailer resting on it without any securing devices in calm conditions.

However, the principal object of the present invention is to make available a cargo support that is capable of being manufactured and handled simply, yet is still capable of being attached securely to the deck.

The aforementioned object is achieved by means of an arrangement in accordance with the present invention, which is characterized essentially in that tensioning devices such as straps, lines, ropes or chains, etc., that are capable of being accumulated and withdrawn, are capable of being accommodated internally in the support stand, which devices are so arranged as to be capable of detachable attachment to the deck of the vessel and tensioning, and in that the legs of the support stand exhibit friction-increasing means to increase the friction with the deck of the vessel.

The invention is described below as a preferred illustrative embodiment, in conjunction with which reference is made to the accompanying drawings, in which.

BRIEF DESCRIPTIONS OF THE INVENTION

The idea of invention is to have integrated lashing straps in the crossbar of the cargo support stand, which are drawn out to either side of the stand, in the same way as the power cord of a vacuum cleaner is drawn out. A hook located at one end of the strap is attached to a fitting in the deck of the ship and tensions the strap with the help of a tensioning device, which resembles the tensioning devices that are used to secure a load to a trailer. The tensioning device has a nut-like attachment, to which a crank handle or a box spanner is attached and is used to tension the strap. Also located on this nut-like attachment is a ring, in which a locking pin engages and thus keeps the strap tensioned. This locking pin is depressed to release the tensioning device. The hook is raised from the fitting on the deck of the vessel. When the hook is released, the strap must be retracted automatically into the crossbar of the stand with the help of springs, in the same way as the power cord of a vacuum cleaner. It is also necessary to lash the rear end of the trailer in the traditional way with two lashings.

As previously mentioned, it is permissible to use a cargo stand without locking when the weather conditions permit. When the weather does not permit the cargo to be left unlashed, four lashings will be sufficient. According to the description, straps are used. In the event that use is made of trailer stands that are attached to the kingpin of the trailer, the stand is unable to overturn in the event of elongation.

The stand is built from standard profiles, which makes it very inexpensive. Both the legs and the crossbar are so-called VKR or KKR profiles, and the foot and its support are made of U-section channels. The support sits only in one direction because the unladen support stand (which weighs only 350–400 kg) must not overturn when it is attached to the loading vehicle, for example a tugmaster.

Figure 8:
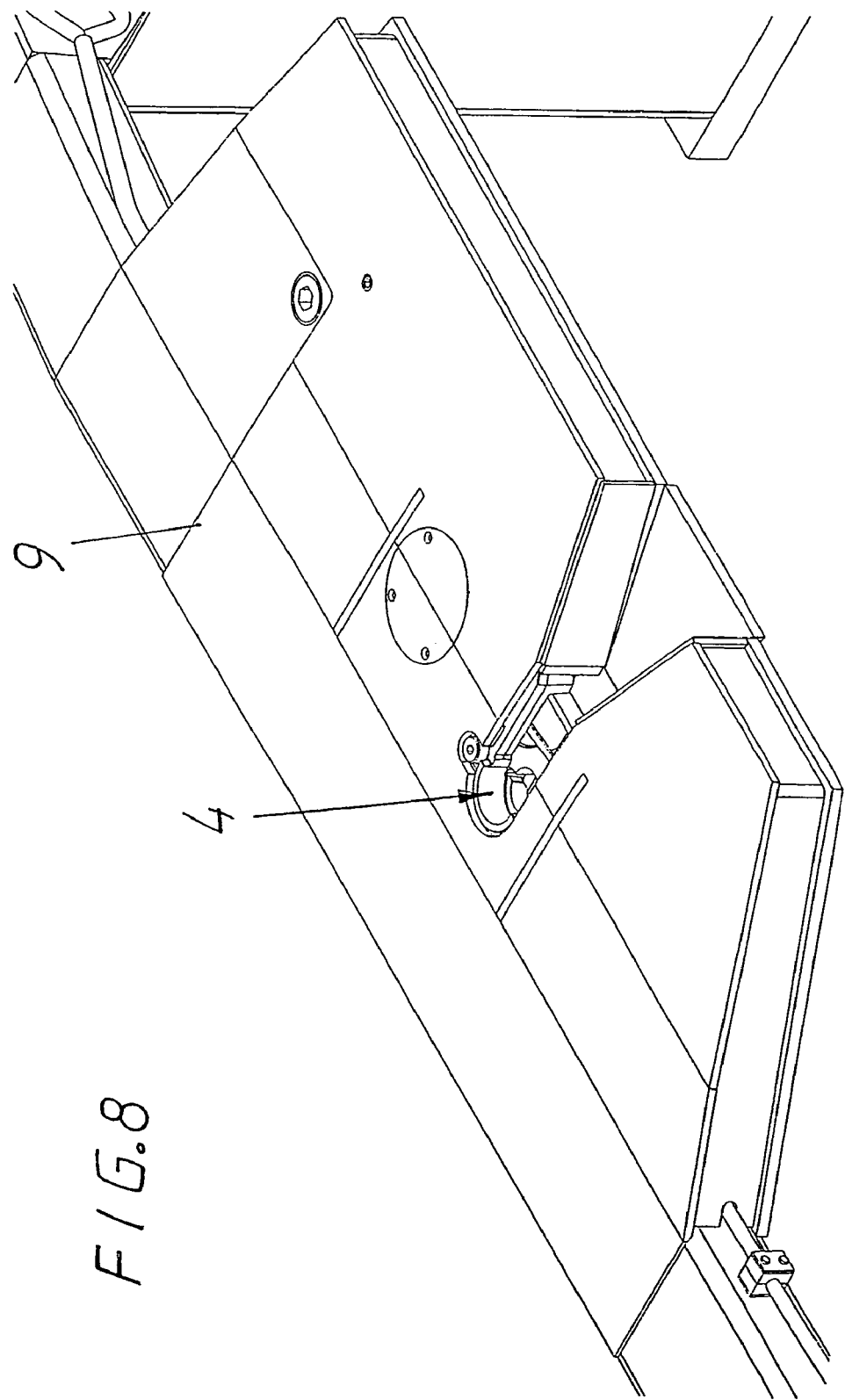
FIG. 8 shows connecting means for the attachment pin of a trailer in the upper rear end of the support stand.
Figure 9:
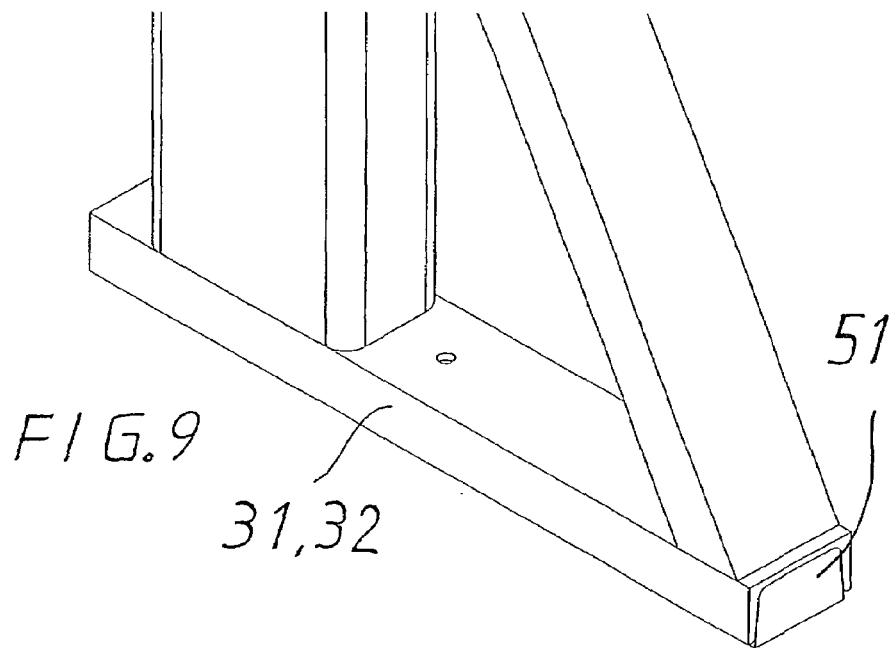
FIGS. 9 and 10 show the foot part of the support stand viewed respectively at an angle from above and at an angle from below.
Figure 10:
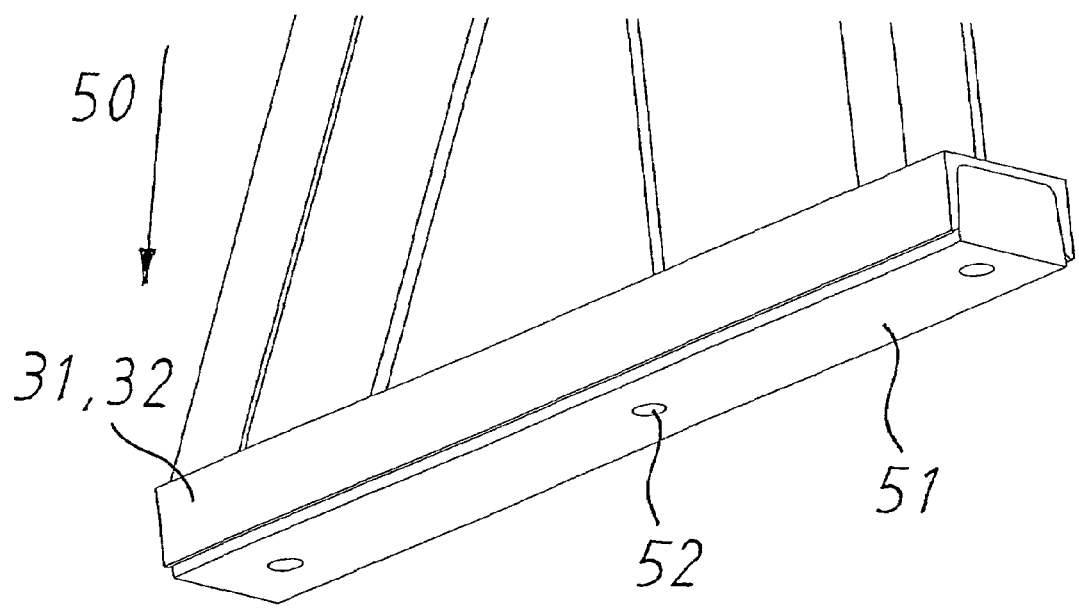

There is also an integrated fifth wheel on the support stand, as clearly illustrated in FIG. 8.

In spite of its simplicity, the invention enables considerable safety to be achieved. One important feature is the locking of the support stand to the kingpin of the trailer.

It is important for the driver to ensure that this locking mechanism is properly locked so that the trailer is not lost when driving at the terminal or on board a vessel. An indicator, for example painted red, can be situated in the leg of the stand on the driver's side to indicate whether the fifth wheel is locked. If a wedge which retains a claw, which in turn holds the kingpin of the trailer, begins to creep out of engagement, a wire attached to the wedge pulls on the indicator so that the driver can see what is happening in good time.

DETAILED DESCRIPTION OF THE INVENTION

Figure 1:
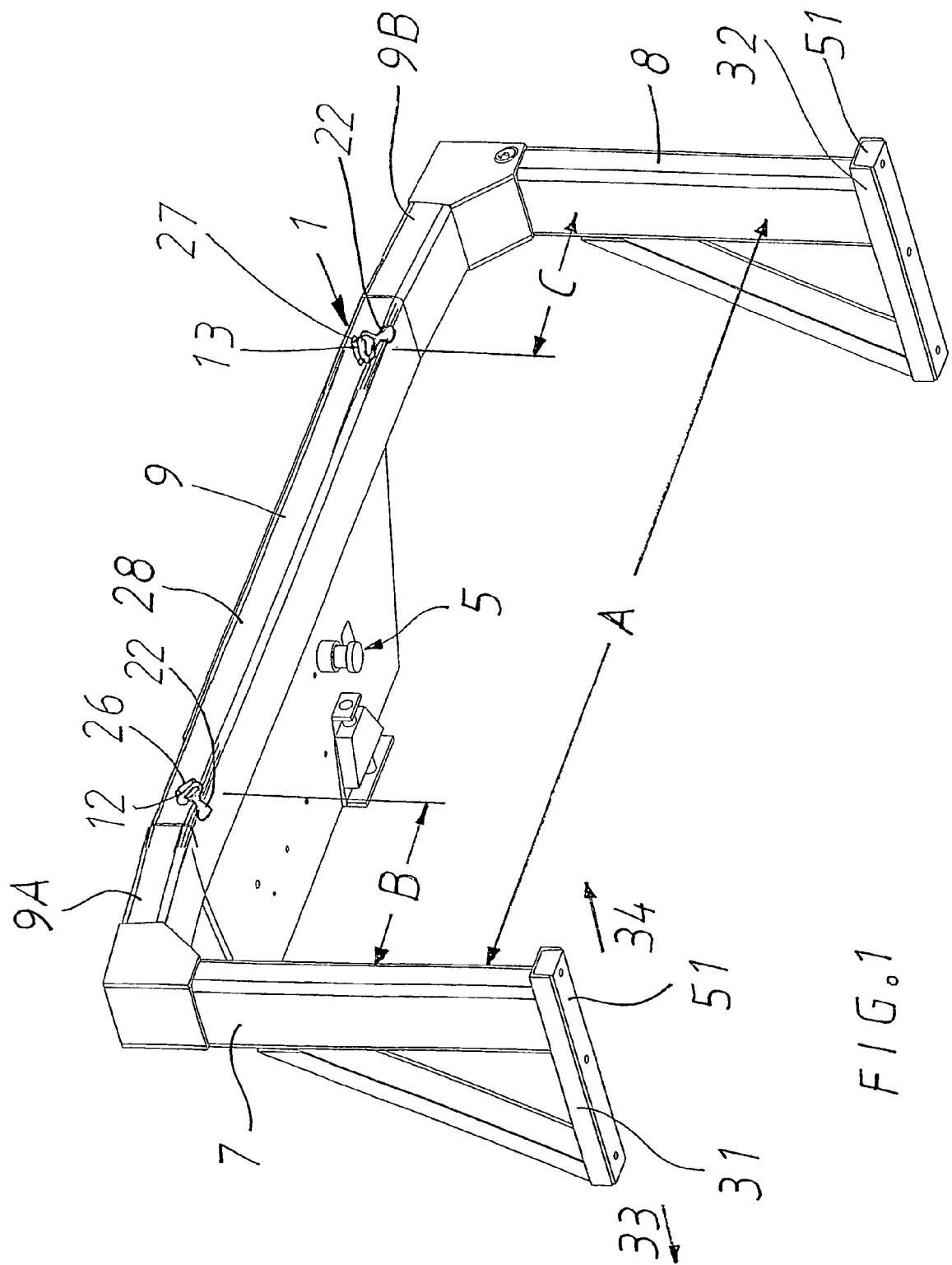
FIGS. 1 and 2 show a support stand in accordance with the invention viewed in perspective respectively at an angle from below and from the front and at an angle from above and from the rear.
Figure 2:
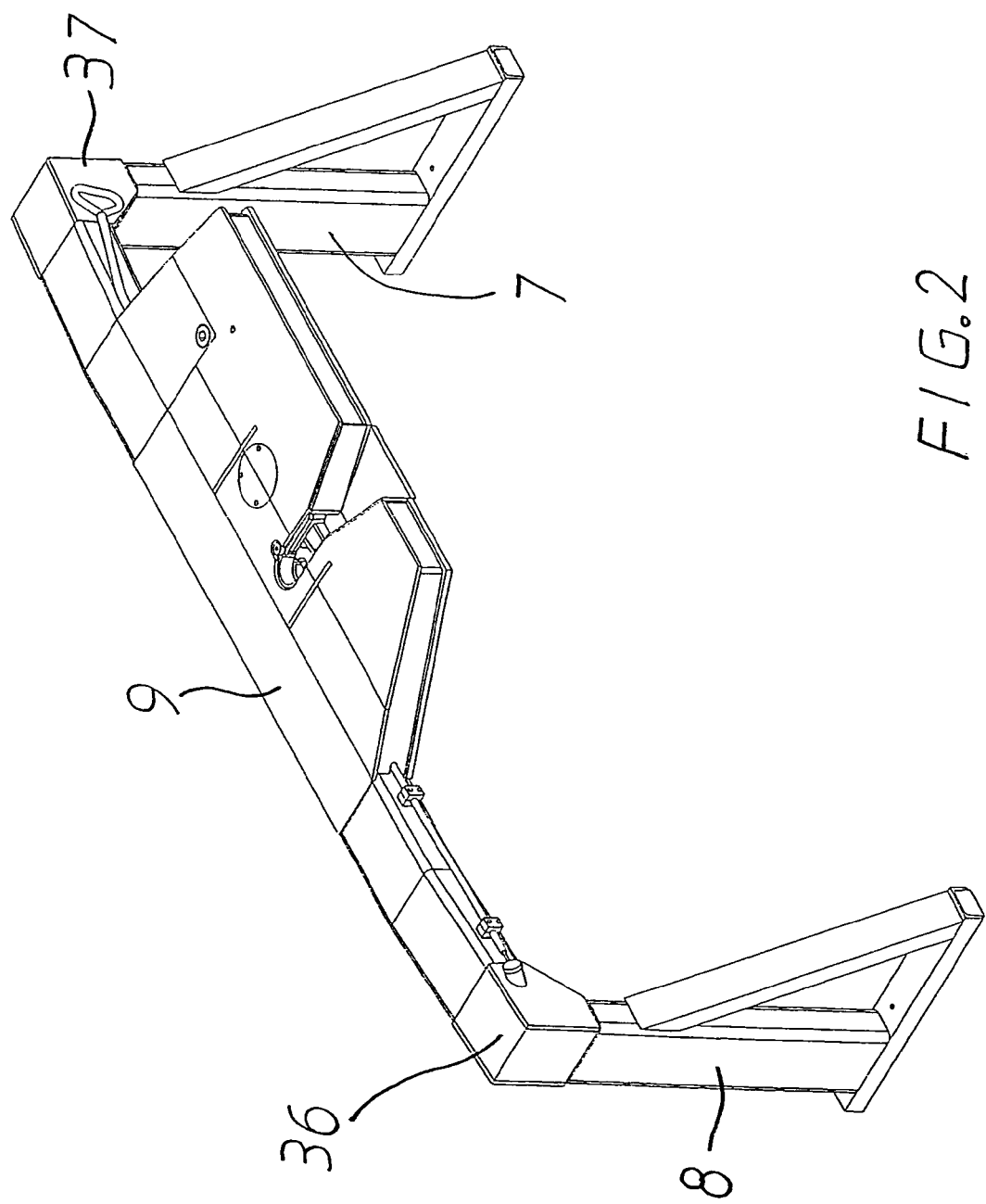
Figure 3:
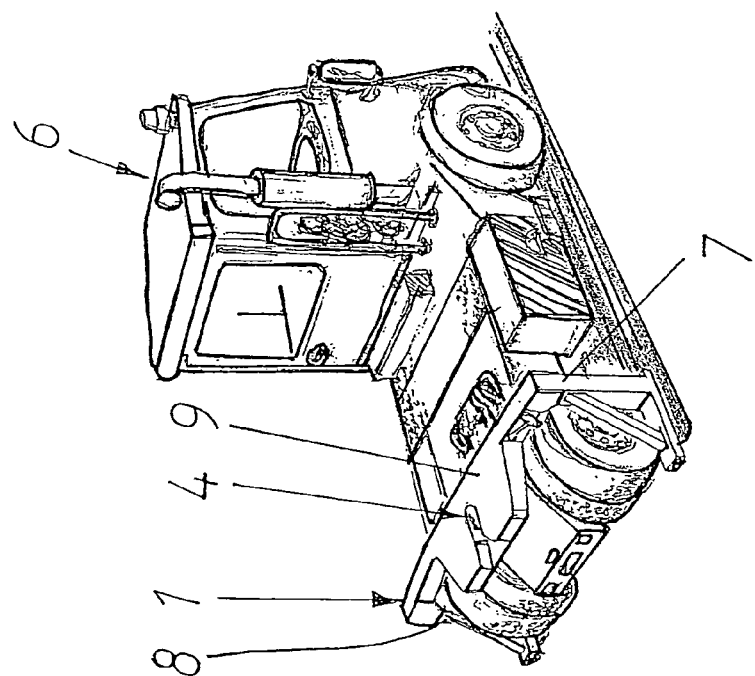
FIG. 3 shows the support stand in a position connected to a loading vehicle.
Figure 4:
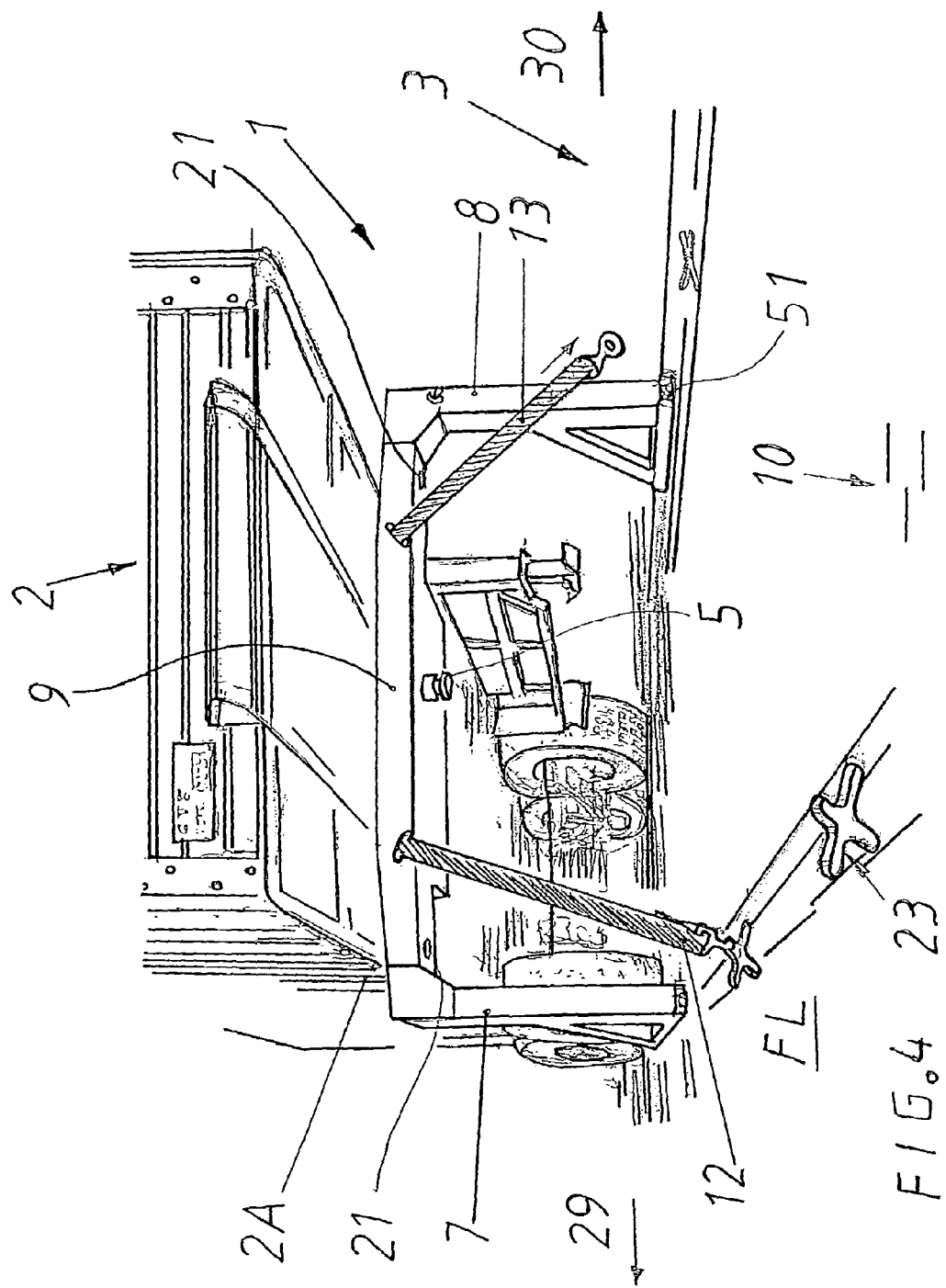
FIG. 4 shows the support stand positioned on the deck under a trailer and in a secured position.
Figure 5:
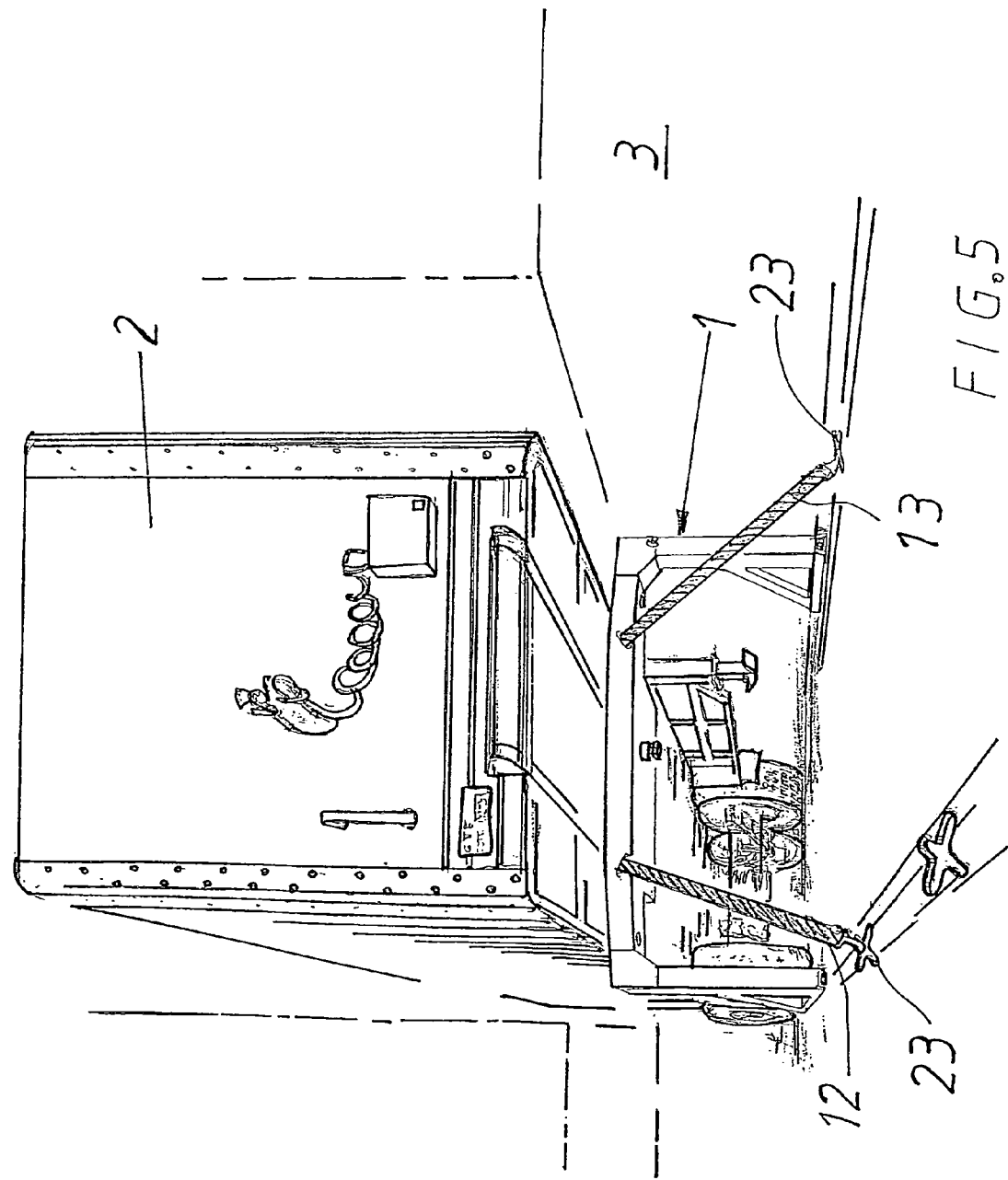
FIG. 5 shows the support stand in the finished, attached position.
Figure 6:
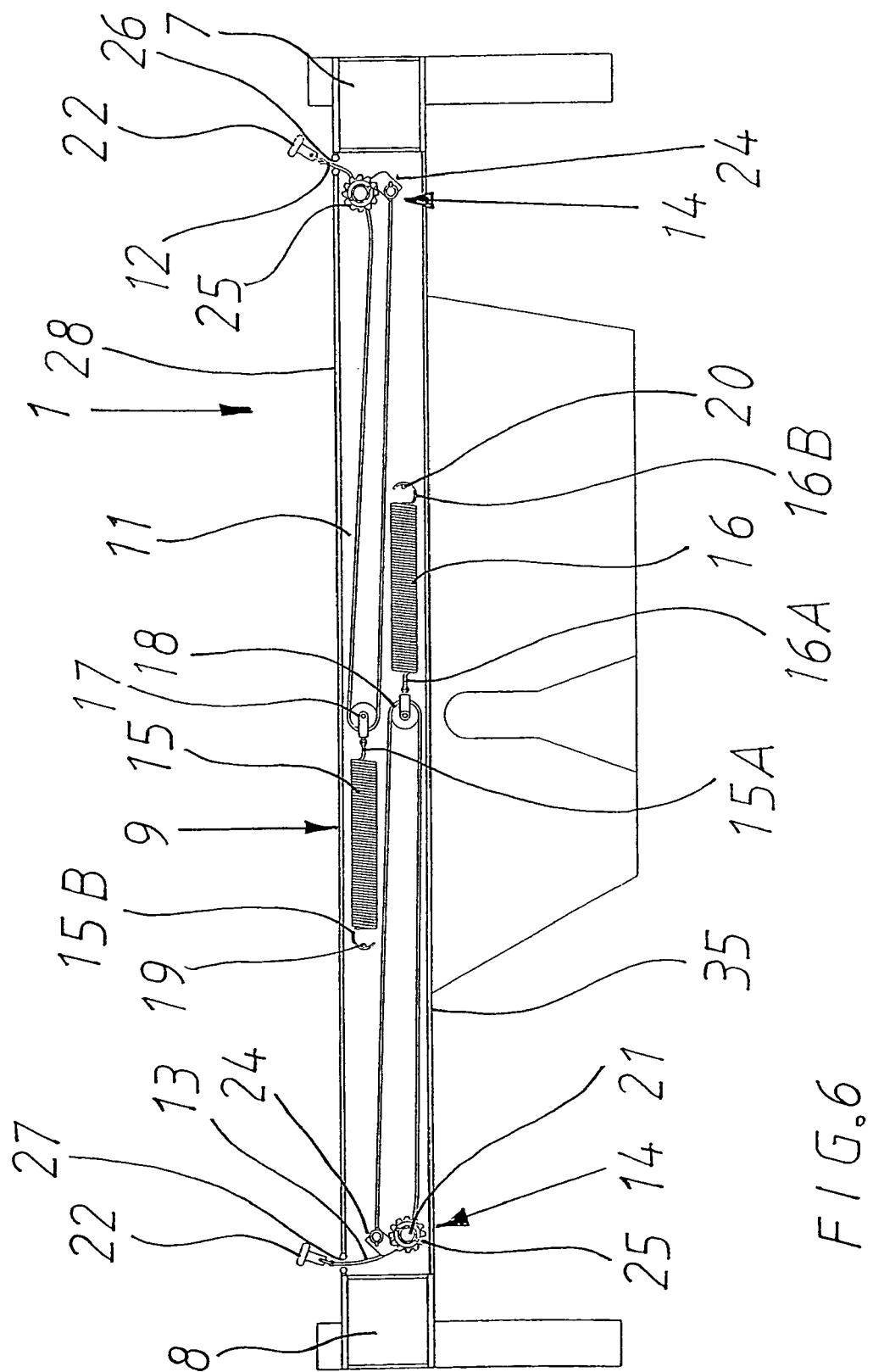
FIG. 6 shows a sectioned view through an upper horizontal crossbar on the support stand and tensioning devices accommodated therein.
Figure 7:
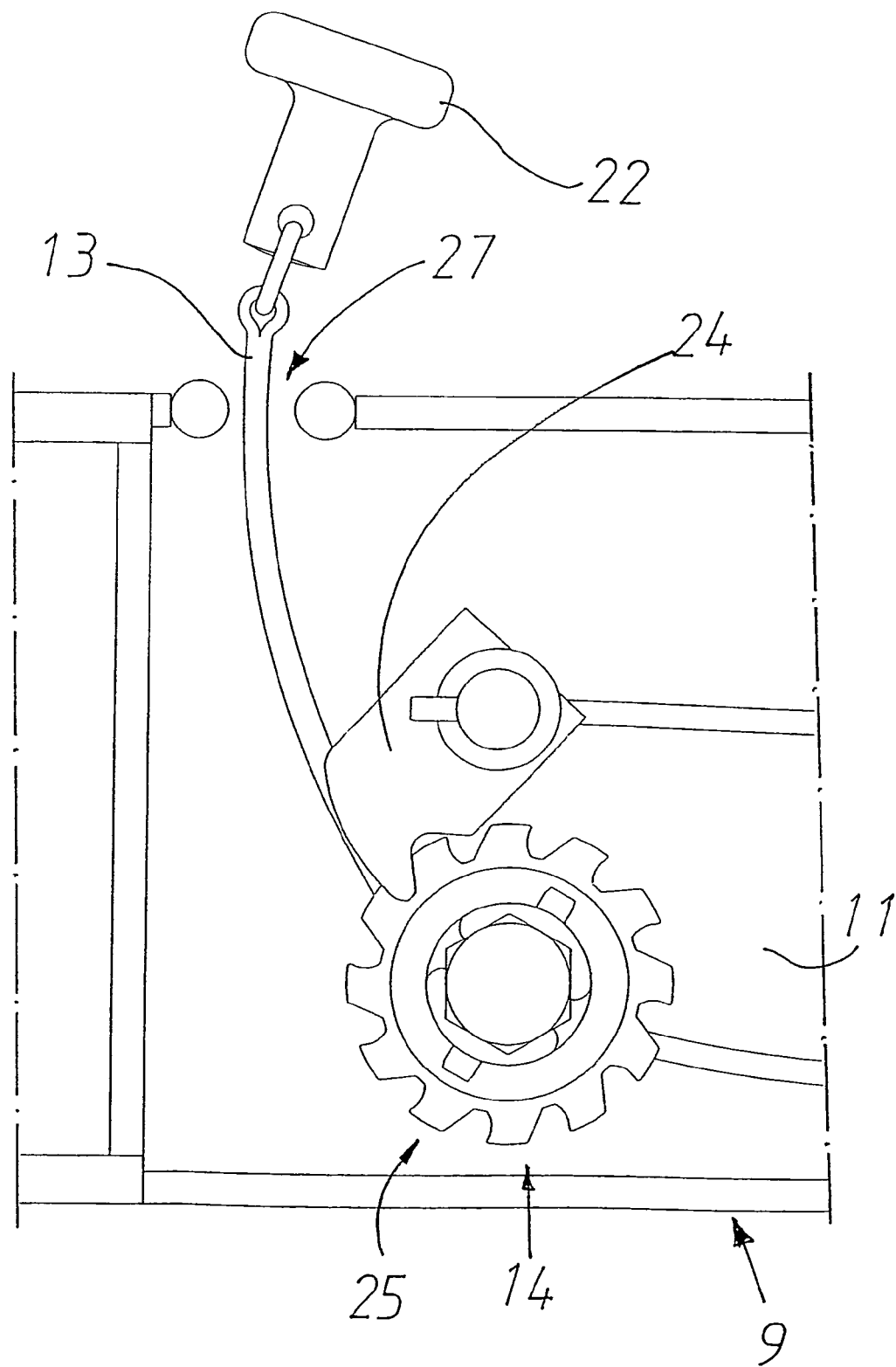
FIG. 7 shows a locking and clamping arrangement for the tensioning device.

The function of an arrangement 1 for supporting the front end 2A of a trailer 2 when the aforementioned trailer is parked on board vessels 3 and other vehicles, comprising connecting means 4, 5 to permit the detachable attachment of the support 1 respectively to a trailer of the kind in question and to a mobile loading vehicle 6, is illustrated in FIGS. 3–5 in the drawings. The aforementioned support in this case is in the form of a stand 1, which exhibits pairs of support legs 7, 8 situated at a mutual distance A from one another. Extending between these is an essentially horizontal crossbar 9, viewed when the supporting stand 1 is set up on a horizontal deck 10 or some other base.

In accordance with the invention, at least two tensioning devices 12, 13, preferably straps, but also lines, ropes or chains, for example, that are capable of being accumulated and withdrawn, are accommodated internally in a suitable space 11 inside the support stand 1. These are so arranged as to be capable of detachable attachment to the deck 10 of the vessel and of being tensioned with the help of appropriate means 14 for the purpose. The legs 7, 8 of the support stand also exhibit friction-increasing means 51 to increase the friction with a vessel deck 10 of the kind in question when the support stand 1 is set up thereon.

More specifically, the aforementioned tensioning devices 12, 13 are capable of being accommodated, accumulated and extending in and along the crossbar 9 of the support stand. Each of the tensioning devices is so arranged in the preferred illustrative embodiment as to be doubled up, and each one is attached to its own individual spring 15, 16 via a deflection device 17, 18, each of which is preferably in the form of an individual wheel or roller that is secured to one end 15A, 16A of the spring. The opposite end 15B, 16B of each helical spring executed as a tension spring is secured to an attachment 19, 20 in the aforementioned crossbar 9.

Each of the tensioning devices 12, 13 is capable of actuation by its own winch 14 enabling them to be tensioned by it, as mentioned above in the text. With the help of a suitable crank handle or box spanner, the winch 14 is actuated via a nut-like attachment 21 enabling it to be extended after the anchoring part 22 situated at the end of the tensioning devices 12, 13, for example a thickened area, hook or other connecting part, has been connected to an intended retainer 23 in the deck. The aforementioned retainer is preferably formed in a previously disclosed fashion by recesses 23 in the deck 10. The tensioning devices 12, 13 are also capable of actuation by a locking device 24 enabling them to be locked in the extended secured position FL. The aforementioned locking device 24 can be in the form of a hook which enters into engagement with a toothed wheel 25. In order to release the tensioning devices 12, 13, the aforementioned locking device 24 is caused to be released from the associated toothed wheel, etc., 25, after which the tensioning devices 12, 13 are drawn in with the help of an associated spring through an associated opening 26, 27 in the crossbar 9.

The aforementioned tensioning devices 12, 13 are so arranged as to be capable of being drawn out through openings 26, 27 that are situated on the front side 28 of the crossbar, and which are preferably in the form of inclined, slot-shaped openings 26, 27, as shown in FIG. 4, so that the tensioning devices 12, 13, if they are executed as straps, can be pulled easily in an oblique direction to the side 29, 30 from the support stand 1. The aforementioned openings 26, 27 are preferably situated at a certain distance B, C from each of the ends 9A, 9B of the crossbar 9.

The support stand 1 exhibits anti-tipping supports 31, 32, which extend essentially in a direction 33, 34 across the aforementioned crossbar 9.

Both legs 7, 8 of the support stand exhibit angled supports in the form of feet 31, 32 which extend together in a direction 33 away from the crossbar 9 on its side 35 that is situated opposite the side 28 on which the tensioning device openings 26, 27 are situated. The aforementioned support feet 31, 32 are so arranged as to extend straight backwards 33 or inwards at an angle, not shown here, thereby permitting the support stands 1, 1, 1 to be stacked closely together, preferably respectively inserted into and accommodating an adjacent support stand 1, in the same way that shopping trolleys are parked together near the tills in shops, or objects such as glasses, plates, etc., are stacked in one another.

Attached to the under side of the support stand are friction-increasing elements 51, preferably consisting of rubber material. Strips of rubber of appropriate length can be accommodated and attached in this way to the profile-shaped feet 31, 32 of the support stand, the open part 33 of which faces in a direction downwards 50 towards the subjacent deck 10 of a vessel, viewed when the support stand 1 is set up on board a vessel 3. The aforementioned rubber strips 51, which exhibit the same frictional characteristics as a trailer deck, may be secured with bolts 52, for example, or may be glued in place or retained in some other suitable, previously disclosed fashion.

The Support Stand in Accordance with the Invention is Handled as Follows:

The support stand, which is collected by a "tugmaster" in a garage on the quay, has a "kingpin" to which the tugmaster connects its fifth wheel. This assembly now collects a parked trailer and connects the "kingpin" of the trailer to the fifth wheel of the support stand. The driver then connects compressed air from the tugmaster to the trailer brakes, so that the parking brake is released once the right pressure has been achieved. The driver also cranks up the legs of the trailer and releases the air from the suspension system, so that the chassis rests firmly on the frame. Once this has been done, the driver drives the trailer onto the vessel and parks it in its intended position. The fifth wheel on the tugmaster (which is operated with compressed air) releases the trailer stand, and the driver drives off the vessel to collect the next assembly. When the weather conditions do not permit an unlashed cargo, the support legs 7, 8 are anchored securely to the deck 10 of the vehicle with their straps 12, 13, etc., as described above, and unloading takes place in the reverse sequence.

In order to permit simple manufacture and assembly of the support stand 1, this is executed as a unit that is capable of assembly. Both legs 7, 8 of the support stand are thus detachably attached to the crossbar 9 of the support stand 1 with the help of an insert component, and elements 36, 37 connecting together and welded to the parts 7, 8, 9.

The nature and the function of the invention should have emerged from the foregoing and from the illustrations provided in the drawings, and the invention is naturally not restricted to the embodiment described above and illustrated in the accompanying drawings. Modifications are possible, in particular with regard to the nature of the various parts, or by the use of equivalent technology, without departing from the area of protection afforded to the invention as defined in the Patent Claims.

The invention claimed is:

1. Support for the front end of a trailer when the trailer is parked on deck on board vessels comprising:
   a support,
   connecting means for the detachable attachment of the support respectively to the trailer and to a mobile loading vehicle, said support comprises a stand with pairs of fixed support legs situated at a mutual distance from one another,
   tensioning devices, and a crossbar,
   anti-tipping supports having feet at both legs of the stand, the feet extending in a direction away from the crossbar on its side that is situated opposite said tensioning devices, straight backwards or inwards at an angle which extend essentially across the crossbar, the crossbar extending between the support legs, said tensioning devices capable of being accumulated and withdrawn, are accommodated internally inside the stand, all elements of the tensioning devices being contained below a top surface of the support, said tensioning devices arranged as to be capable of detachable attachment to the deck of the vessel and of being tensioned,
   the support legs of the stand having friction-increasing elements attached to the under side of the stand to increase the friction with the vessel deck,
   a winch, and
   a locking device;
   wherein the tensioning devices are capable of being accommodated, accumulated and extend in and along the crossbar of the stand, each of the tensioning devices is doubled up and being attached to a spring via a direction-changing roller device,
   the tensioning devices are capable of actuation by the winch enabling them to be tensioned and are capable of actuation by the locking device enabling them to be locked in the extended secured position, and
   the tensioning devices are so arranged as to be capable of being drawn out and subsequently automatically retracted through openings that are situated on the front side of the crossbar.

2. Arrangement in accordance with claim 1, wherein the anti-tipping supports comprise angled feet exhibited on both the legs of the stand and the angled feet extend in a direction away from the crossbar on its side that is situated opposite the tensioning devices, straight backwards or inwards at an angle, permitting stands to be stacked closely together.

* * * * *